Feb. 19, 1935. H. ROSE 1,992,130
HEATING APPARATUS FOR AUTOMOTIVE VEHICLES
Filed Sept. 18, 1933 2 Sheets-Sheet 2
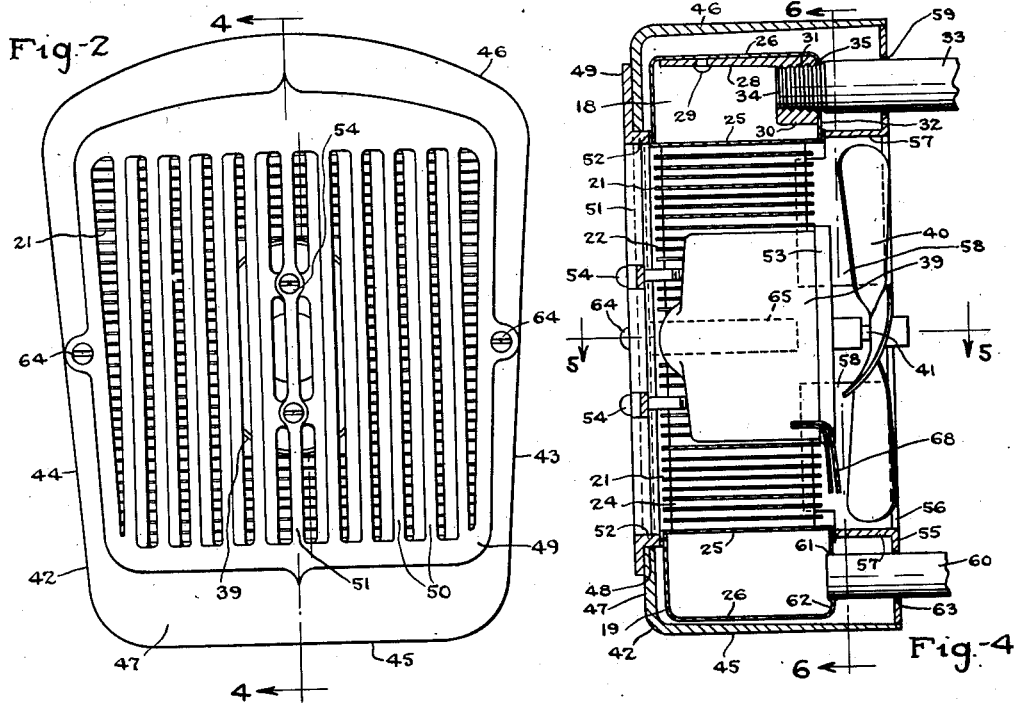
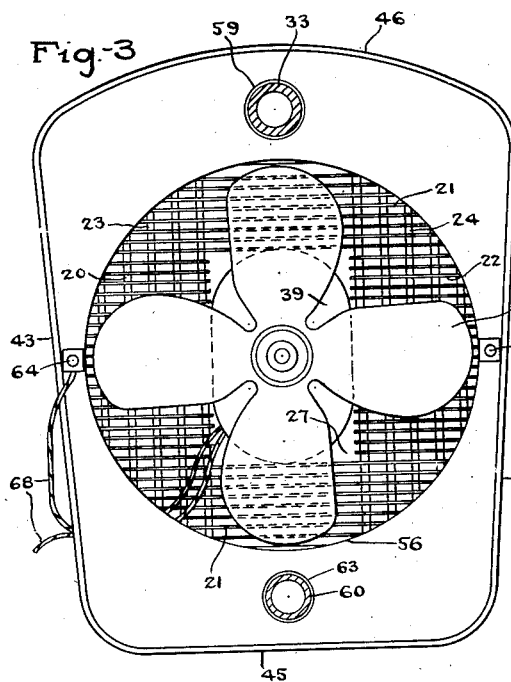
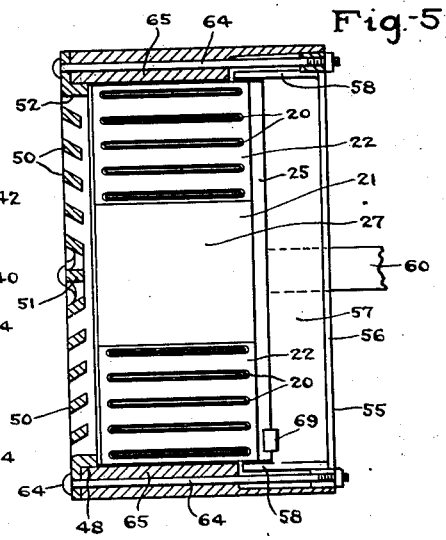
Inventor:
Harry Rose.
By G. H. Braddock
Attorney.

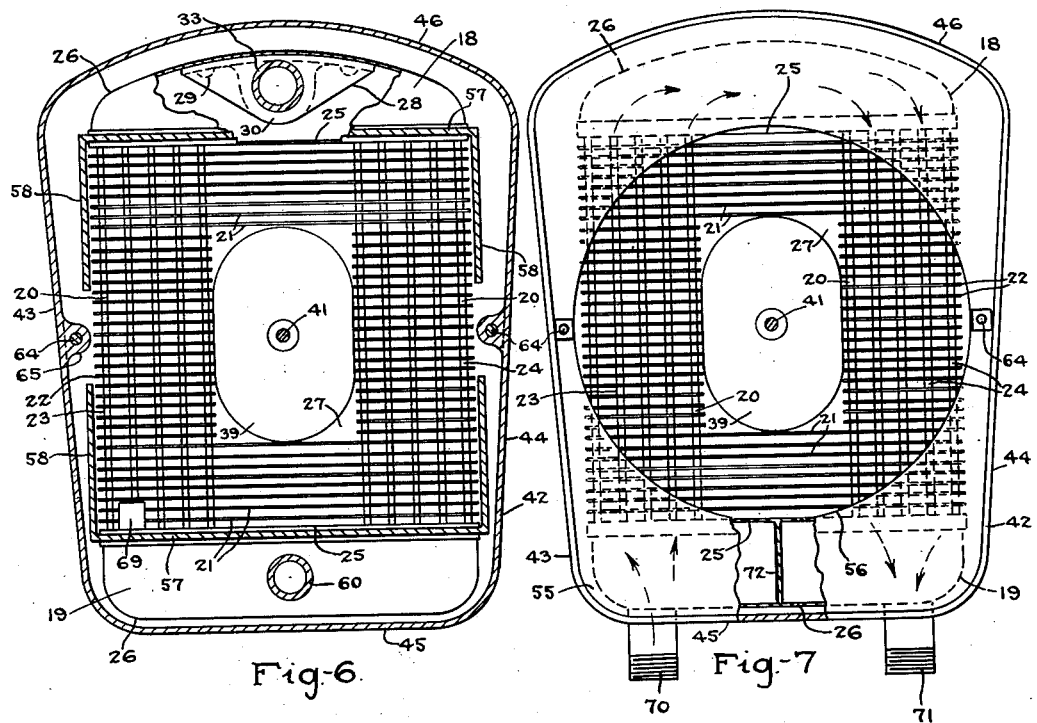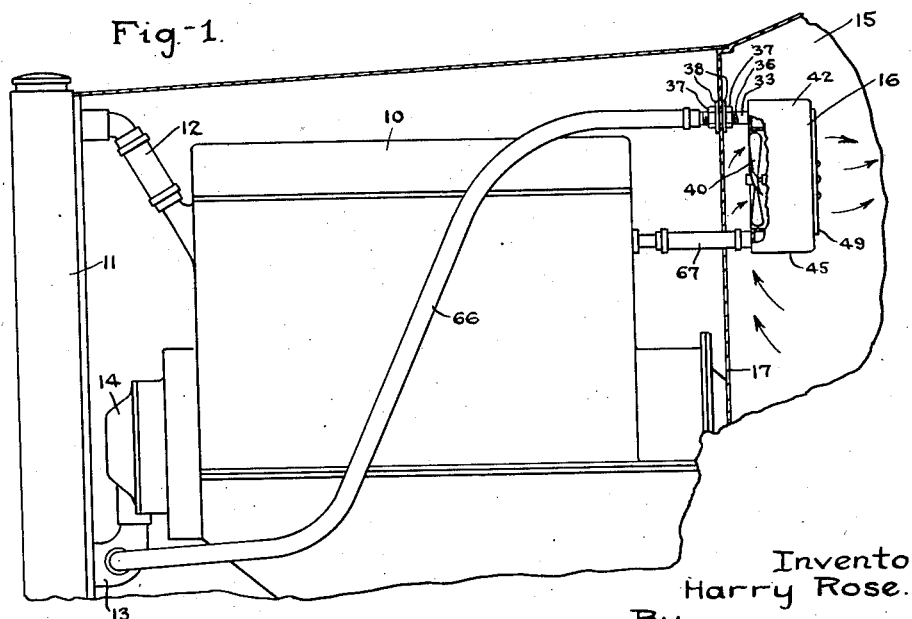

Patented Feb. 19, 1935

1,992,130

UNITED STATES PATENT OFFICE 1,992,130

HEATING APPARATUS FOR AUTOMOTIVE VEHICLES

Harry Rose, Minneapolis, Minn.

Application September 18, 1933, Serial No. 689,943

17 Claims. (Cl. 257—137)

This invention has relation to a heater for warming the interior space of an automotive vehicle body, such, for example, as a pleasure automobile, taxicab, bus, or truck, and more particularly relates to an automotive vehicle heating apparatus of the type wherein a part or all of the fluid-cooling or circulating medium for the internal combustion engine of the vehicle is diverted from the fluid-cooling or circulating system and utilized in said heating apparatus as the medium for warming the space to be heated of the automotive vehicle.

An object of the invention is to provide an automotive vehicle heater of the present character which will be of novel and improved construction, and which can be mounted in an automotive vehicle in novel and improved manner.

A further object is to provide an automotive vehicle heater which will be of practical and compact design to occupy but a minimum of space in the interior of the body of an automotive vehicle, and will, at the same time, incorporate features and characteristics of construction adapted to cause the heater to capably and efficiently function at substantially the maximum capacity of heaters of the present general type which occupy considerably more space in automotive vehicle bodies.

A further object is to provide an automotive vehicle heater designed and constructed to be associated with the body of an automotive vehicle in an easier and more simple manner than heretofore known.

A further object is to provide an automotive vehicle heater so designed and constructed that it can be assembled with the body of an automotive vehicle, adjacent an inner wall or surface of said body, by the employment of but a single tubular or pipe support for said heater.

A further object is to provide a heater of the present character which will include heater supporting structure of simple, novel and improved design.

A further object is to provide an automotive vehicle heating unit including air heating means and air blowing means compactly constructed and arranged, as well as a heater supporting structure designed to be assembled with a single tubular or pipe support for the heater.

A further object is to provide an automotive vehicle heating unit which will include a core consisting of spaced apart fluid or water tanks, a plurality of spaced apart fluid or water carrying tubes communicating with said tanks and comprising spaced apart banks of tubes extending from tank to tank and providing a space between said banks of tubes, and fins upon said tubes extending transversely thereof, and will also include an electric motor mounted within said core between the banks of tubes and adjacent to and desirably surrounded by said fins, the shaft of said motor supporting a blower or fan arranged in proximity to and without the core for forcibly circulating air past and over said tubes and between and over said fins.

A further object is to provide an automotive vehicle heating unit having an electric motor mounted within the core thereof in novel and improved manner.

A further object is to provide an automotive vehicle heating unit including a fluid-heated, air-heating core, a motor mounted within said core and adapted to drive a blower or fan situated adjacent the core, and a casing for said core, motor and blower or fan, said heating unit also desirably including a grill for said core and a shroud for said blower or fan, and the whole being associated, assembled and secured together in novel and improved fashion.

A further object is to provide a heating unit as just stated, which may additionally and desirably include as an integral part of the core thereof, a novel and improved supporting structure for said heating unit.

A further object is to provide an automotive vehicle heater of the present character which will include simple and efficient means of novel and improved construction for diverting air blown through the heater and thus warmed, to desired parts of the interior space to be heated of an automotive vehicle.

A further object is to provide an automotive vehicle heater of the general type as hereinbefore appearing, which can, with but the slightest of modifications, be installed in different parts of an automotive vehicle body, as, for example, upon the dash when the heater is of a certain construction, and upon some other part of the vehicle when the heater is of slightly modified construction.

And a further object is to provide an automotive vehicle heater which can be manufactured at relatively low cost, due to the fact that the heater is of quite simple and inexpensive design.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible so long as within the spirit of the invention and the scope of the claims which follow.

In the accompanying drawings forming a part of this specification,

Fig. 1 is a side elevational view of a heating apparatus having the features of the invention incorporated therein, disclosing said heating apparatus as when applied to use in an automotive vehicle;

Fig. 2 is an enlarged front elevational view of the heating apparatus;

Fig. 3 is a rear elevational view of said heating apparatus on the scale of Fig. 2;

Fig. 4 is a central vertical sectional view, taken on line 4—4 in Fig. 2;

Fig. 5 is a central horizontal sectional view, with the electric motor and fan removed, taken as on line 5—5 in Fig. 4;

Fig. 6 is a sectional elevation, taken as on line 6—6 in Fig. 4; and

Fig. 7 is a rear elevational view, partially broken away and with the electric fan removed, disclosing a heating apparatus of slightly modified construction made according to the invention.

With respect to the drawings and the numerals of reference thereon, 10 denotes the engine jacket, 11 the fluid-cooling radiator, 12 the fluid connection from the jacket 10 to the radiator, 13 the fluid connection from said radiator to said jacket, and 14 represents, generally, the usual pump for the fluid-cooling medium of an automotive vehicle 15 of any ordinary or preferred character, such as a pleasure vehicle, taxicab, bus, or truck. Ordinarily, the fluid-cooling medium is circulated by the pump 14 from the jacket 10 through the connection 12 to the radiator 11, and back to the jacket from the radiator through the connection 13.

In Fig. 1 of the drawings, the novel and improved heating unit, designated 16, is mounted within the interior of the automotive vehicle 15, numeral 17 indicating the dash of said vehicle upon which said heating unit is supported in a manner to be fully set forth. As also to be made clear, suitable fluid conveying connections are provided whereby a part or all of the fluid-cooling or circulating medium for the internal combustion engine of said vehicle is diverted and utilized as the medium for supplying heat to said unit 16.

The heating unit 16 includes a fluid-heated, air-heating core consisting of an upper fluid or water tank 18, a lower fluid or water tank 19, a plurality of spaced apart fluid or water tubes, denoted 20, extending between said tanks 18 and 19, and fins, indicated 21 and 22, in spaced apart relation upon said tubes 20 and extending transversely thereof. The fluid or water tubes 20 are arranged in two spaced apart banks or sets of tubes, represented 23 and 24, respectively. Each tube 20 is relatively flat and wide, said tubes desirably being of slightly less width than the width of the tanks 18 and 19. Said tanks are desirably of equal length and width. The outermost tubes 20 of the different banks or sets of tubes 23 and 24, are arranged adjacent the opposite ends of the tanks, as very clearly disclosed, and all of said tubes 20 are parallelly arranged.

Each of the fluid or water tanks 18 and 19 may desirably consist of a header plate 25 into which the adjacent ends of the tubes 20 are suitably fastened in fluid-tight fashion, as by soldering or otherwise, and a housing member 26 suitably fastened, also in fluid-tight fashion, as by soldering or otherwise, to the marginal portions of the corresponding header plate 25, as very clearly shown in Fig. 4. Each housing member 26 may be of about the curvilinear configuration illustrated, or of any other preferred shape.

The fins 21, adjacent the opposite end portions of the core, are desirably of relatively small thickness, of width slightly greater than the width of the tubes, which may be of equal width, and of length about equal to the length of each tank. The fins 22, between the two sets of fins 21, are of the same thickness as the fins 21 but are shorter, being in each instance arranged upon the tubes of but a single bank or set of tubes 23 or 24, as the case may be. The forward and rearward edges of the fins 22 desirably terminate flush with the forward and rearward edges of the fins 21, and the outer edges of said fins 22 desirably terminate flush with the outer edges of said fins 21. The inner edges of the fins 22 terminate at the location of the innermost tubes 20 of the different banks or sets of tubes 23 and 24. The innermost fins 21 of the two sets of longer fins are desirably spaced apart a distance somewhat greater than the distance between the innermost tubes 20 of the two banks or sets of tubes 23 and 24, and thus a rectangular space, designated 27, in the core and between the banks or sets of tubes and surrounded by the fins, is provided for a purpose to be made clear.

The tubes 20 of the different banks or sets of tubes are desirably spaced at equal distances from each other, and each of said tubes 20 is desirably perpendicular to each header plate 25, with the widths of the tubes preferably disposed perpendicularly to a plane extending longitudinally and perpendicularly through both header plates.

The fins 21 and 22, respectively, are likewise desirably spaced at equal distances from each other, with the uppermost and lowermost shorter fins 22 being spaced at this same distance from the adjacent longer fins 21, as will be clear from the drawings. Said fins 21 and 22 may be associated with the tubes 20 before said tubes are secured to the header plates, by providing openings through the fins of size to fit the tubes, and sliding said fins over said tubes, or sliding the tubes through the openings in the fins. Preferably, the fins are secured to the tubes, as by soldering or otherwise, to be in intimate heat conveying contact therewith.

When a core constructed as described is completed, it comprises a generally rectilinear article of about the shape as shown in Figs. 4, 5 and 6, said article having opposite end portions thereof, constituted by the housing members 26 of the tanks, constructed along somewhat curvilinear lines.

A supporting structure for the heating unit is adapted to be assembled with a single tubular or pipe support for said unit. The fluid or water tank 18 conveniently carries at the interior thereof a suitable bracket 28, said bracket being riveted or otherwise secured, as at 29, to the upper wall of the upper housing member 26. A downwardly extending flange 30 of the bracket 29 includes a tapped hole 31 adjacent to the rearward wall 32 of said upper housing member. A tubular or pipe support 33 has a threaded inner end portion 34 turned into the tapped hole 31, as disclosed more clearly in Figs. 4 and 6. The tubular or pipe support 33 extends through an opening 35 in said rearward wall 32, and a fluid-tight seal is provided between said opening 35 and the tubular or pipe support, as by soldering or otherwise. The bracket 28 is desirably constructed so as to spread over a considerable area on the inside of the housing member of the upper tank 18, to provide a relatively wide supporting structure for the heating unit. Also, the bracket 28 and the tubular or pipe support 33 are of quite rigid structure, and when said tubular or pipe support is rigidly secured in the rearward wall 32 of the upper housing member 26, as by soldering, said tubular or pipe support is obviously fixed against turning movement in the bracket 28.

The tubular or pipe support 33 may constitute a single or unitary means through the instrumentality of which the heating unit can be mounted upon a fixed part of an automotive vehicle body. As disclosed very clearly in Fig. 1, the outer portion 36 of the tube or pipe 33 is externally threaded and passes through a hole in the dash 17 of the vehicle, said hole closely fitting about the tube or pipe. Said tube or pipe 33 is rigidly secured in the dash of the vehicle by adjustably supporting nuts 37 upon the tube or pipe, there being one nut at each side of the dash, each of which nuts can be turned up against a washer 38 between the nut and the dash. Thus the core of the heating unit is rigidly secured upon the automotive vehicle body, interiorly thereof.

The space 27 within the core is for receiving an electric motor 39 having a blower or fan 40 fixed upon the motor shaft 41. The motor is of dimensions to nicely fit into the space 27, and the arrangement is such that the blower or fan 40 will be situated adjacent the core in fairly close relation thereto, about as illustrated in the drawings. When electric power is applied from a source (not shown), such as the battery of an automotive vehicle, to the motor 39, the blower or fan is driven to force air through the core, past and over the fins and tubes thereof.

A casing 42 is adapted to contain the assembly of the core, motor and blower or fan. Said casing may more or less freely receive said core. As illustrated, the casing is a box-like member including straight side walls 43 and 44, straight lower end wall 45, curvilinear upper end wall 46, and desirably flat front wall 47 with relatively large rectangular cut-away portion or opening 48 of area about equal to, or a little less than, and approximately similar to, the overall area covered by the forward surfaces or edges of the fins 21 and 22. The back of casing 42, bounded by the walls 43, 44, 45, and 46, is open. The core is inserted in the casing 42 with the front surface of the core adjacent the front wall 47, and so that said core is situated centrally of the cut-away portion or opening 48 to completely cover it.

At the front of the casing 42, and covering the forward area of the fins or tubes, or in other words, covering the cut-away portion or opening 48, there is arranged a grill 49, which grill may be either integral with or separate from said casing 42. Said grill 49 includes a pair of sets of bars or louvers 50 arranged at opposite sides of a center strip 51 thereof, which bars or louvers of the different sets are as disclosed arranged at an angle to deflect the air toward each side of the heating unit, and hence toward opposite sides of an automotive vehicle in which said heating unit may be situated. As shown, the bars or louvers 50 are disposed vertically to effect air passing through the core outwardly. That is, there are two divergent sets of air currents. Evidently, said bars or louvers could just as well be disposed, as, for example, obliquely, to deflect the air downwardly as well as outwardly. The construction described provides a fixed deflector for the heating unit which will accomplish as much in the way of proper deflection of the air as will be accomplished by adjustable types of deflectors, and at a much reduced cost.

As illustrated, the grill 49 is detachable from the casing 42, and includes a rectangular flange 52 adapted to be closely fitted into the opening 48 in the front wall 47 of said casing. See Figs. 4 and 5.

The motor 39 includes a peripheral flange 53 which is located adjacent the blower or fan. The center strip 51 of the grill 49 has openings therein to receive spaced apart screw bolts 54 which are adapted to be turned home into the adjacent surfaces of said motor, that is, those surfaces opposite the blower or fan 40. When said screw bolts 54 are so turned home the peripheral flange 53 and the rectangular flange 52 are drawn up tightly against the core, and the grill, casing, core and motor with fan are held in fixed relation. Thus is the weight of the grill, casing, motor and fan made rigid with the core, which, so to speak, carries said weight back to the single or unitary tubular or pipe support 33.

The back of the casing 42 is covered by a plate 55 constituting a shroud for the blower or fan 40, said plate being closely fitted into the walls 43, 44, 45 and 46 in the manner best disclosed in Figs. 3, 4 and 5 and terminating flush with the free ends of said walls. A circular opening 56 through the plate 55 is situated directly adjacent said blower or fan 40, and is of slightly greater diameter than the overall width of the blades of the blower or fan to offer no interference to the forcing of air through the heating unit, as will be understood. Inwardly extending flanges 57 at the upper and lower portions of the plate 55 engage the adjacent surfaces of the upper and lower tanks, respectively, of the heating unit core, while inwardly extending flanges 58 at the opposite side portions of said plate 55 extend to slightly farther distance from the plate than do the flanges 57 to overlap the opposite ends of some or all of the fins 21 and 22. See Figs. 4, 5 and 6.

The plate 55 includes an opening 59 which receives the tubular or pipe support 33 extending away from the core and out of the casing 42. A tube or pipe 60, which is relatively shorter than the tubular or pipe support 33, is secured in fluid-tight fashion, as by soldering or otherwise, in an opening 61 in the rearward wall 62 of the lower fluid or water tank 19, and said tube or pipe 60 also extends away from the core and out of said casing 42. An opening 63 in said plate 55 receives the tube or pipe 60.

Headed and nutted bolts 64, one at each side of the heating unit, pass through the grill 49, through inwardly extending protuberances 65 upon the casing 42, and through the plate 55. Obviously, when the nuts on the bolts are tightened down, the flanges 57 upon the plate are gripped firmly against the core, so that said plate is rigidly fixed in the casing. Also, the headed and nutted bolts 64 constitute means additional to the screw bolts 54 for firmly binding the grill, the casing and the core in fixed relation to each other.

As will be more clear from Figs. 4, 5 and 6, the protuberances 65, as well as the flanges 58, are arranged in proximate relation to the opposite ends of some of the fins 22. Evidently, all of the screw bolts 54, flanges 53, 57 and 58, headed and nutted bolts 65, and protuberances 65, as well as the grill, casing, core and plate, cooperate with each other to permanently retain the grill, the casing, the core, the motor with blower or fan, and the plate or shroud in the proper and desired fixed relation to each other. Thus, all of the weight of the heating unit is carried back to the tubular or pipe support 33 through the instrumentality of the heating unit core with which said tubular or pipe support is directly associated.

A fluid or water connection 66 extends from the tubular or pipe support 33 to the connection 13, at location in front of the pump 14, and a fluid or water connection 67 extends from the engine jacket 10 to the relatively short tube or pipe 60. Said connection 67 passes through an opening in the dash 17.

Lead wires from the motor 39 are represented 68, and a clip for said lead wires is indicated 69.

It will be evident that when the internal combustion engine of the automotive vehicle 15 is operating, there will be a substantial flow of hot fluid or water from the jacket 10 through the connection 67 and the tube or pipe 60 to the core of the heating unit, and back to said jacket 10 through the tubular or pipe support 33, the connection 66, the connection 13 and the pump 14. Evidently, any other suitable and preferred arrangement for circulating all or any desired portion of the hot fluid or water of the engine cooling system through the core of the heating unit can be substituted for the arrangement disclosed. As illustrated, the flow through the heating unit core is upward. The flow could of course be downward, the hot fluid or water in such an event passing through a suitable connection attached to the tubular or pipe support 33 to here enter the core, and leaving said core by way of the short tube or pipe 60 and a suitable connection attached thereto.

As shown in Fig. 1, the hot fluid or water upon entering the tube or pipe 60 thence passes into the lower fluid or water tank 19. Thence hot fluid or water passes upwardly through each of the relatively flat and wide tubes 20 to the upper fluid or water tank 18. And from the tank 18, the hot fluid or water passes out of the heating unit through the tubular or pipe support 33.

While traveling through the tubes 20, the hot fluid or water gives off heat which is absorbed by the fins 21 and 22, and by rotation of the blower or fan 40 to force air past and over the fins and tubes, the air is caused to be heated and distributed throughout the vehicle body.

By reason of the provision of the separate banks or sets of relatively flat and wide tubes 20, the hot fluid or water is caused to be circulated through the portion of the core of the heating unit over which the circulated air travels at higher velocity than has heretofore been the practice. Thus the hot fluid or water better retains its heat and causes the average temperature of the heating unit to be elevated, so that the novel and improved heater functions capably and efficiently at substantially the maximum capacity of heaters of the present general type which occupy considerably more space in automotive vehicle bodies.

In Fig. 7 there is disclosed a heating unit in all respects like the heating unit already described, except that the present heating unit is of slightly modified construction adapting it to be useful for service at some location in an automotive vehicle other than on the dash, as for example, on the floor of a vehicle. As shown in said Fig. 7, the tubes or pipes 33 and 60 are not employed. In their stead there are a pair of tubes or pipes 70 and 71 attached to the housing member 26 of the lower fluid or water tank 19 at opposite sides of a wall 72 separating said tank 19 into two compartments, one in communication with the bank or set of tubes 23 and the other in communication with the bank or set of tubes 24. Thus, the hot fluid or water is circulated through the heating unit core by passing upwardly through the tubes of one of the banks or sets of tubes and downwardly through the tubes of the other bank or set of tubes.

It will be seen that the main components constituting the novel and improved heating apparatus can be used to make either the type of heating unit of Figs. 1 to 6, or the very slightly modified type of Fig. 7.

What I claim is:

1. In an automotive vehicle heating unit, the combination with a core consisting of spaced apart fluid receiving tanks, a plurality of spaced apart fluid carrying tubes communicating with said tanks and comprising spaced apart banks of fluid carrying tubes extending from one of said fluid receiving tanks to the other, and heat absorbing fins upon said tubes and extending transversely thereof, of an electric motor mounted in said core between said banks of tubes and adjacent to said fins, and a fan fixed to the shaft of said motor and arranged outside said core to forcibly circulate air past and over said tubes and between and over said fins.

2. In an automotive vehicle heating unit, the combination with a core consisting of spaced apart fluid receiving tanks, a plurality of spaced apart fluid carrying tubes communicating with said tanks and comprising spaced apart banks of fluid carrying tubes extending from one of said fluid receiving tanks to the other, and spaced apart heat absorbing fins upon said tubes and extending transversely thereof, there being sets of longer heat absorbing fins adjacent the end portions of said tubes and spanning the distance between said banks of tubes to together with innermost tubes of said banks of tubes provide a concavity within said core, and there being sets of shorter fins adjacent the central portions of said tubes at either side of said concavity, of an electric motor mounted in said concavity, a shaft upon said motor, and a fan carried by said motor shaft and situated outside said core to forcibly circulate air therethrough.

3. The combination as specified in claim 1, a heating unit supporting structure carried at the interior of said core, a support for the heating unit rigidly secured to said supporting structure, and means for rigidly securing said support upon a fixed part of an automotive vehicle.

4. In an automotive vehicle heating unit, the combination with a core consisting of spaced apart fluid receiving tanks, a plurality of spaced apart, relatively wide and flat fluid carrying tubes communicating with said tanks and comprising spaced apart banks of fluid carrying tubes extending from one of said fluid receiving tanks to the other, and heat absorbing fins spaced apart along said tubes and extending transversely thereof, there being shorter sets of fins adjacent the midlengths of the tubes and upon a single bank of tubes only and longer sets of fins adjacent the end portions of the tubes and spanning the distance between said banks of tubes, and said banks of tubes and said fins together providing a concavity within said core and surrounded by the tubes and fins, of an electric motor in said concavity, a motor shaft, and a fan fixed upon said motor shaft and situated adjacent said core.

5. An automotive vehicle heating unit comprising a fluid-heated, air-heating core, a motor mounted in said core and adapted to drive a fan situated adjacent the core, a casing with grill for said core, motor and fan, a plate in said casing and providing a shroud for said fan, means engaging said grill and said motor for securing the motor in the core, and means engaging said casing with grill and said shroud for securing the casing with grill, the core and the shroud in fixed relation to each other.

6. In an automotive vehicle heating unit, the combination with a core consisting of spaced apart fluid receiving tanks, a wall separating one of said tanks into two compartments, a fluid inlet to one of said compartments, a fluid outlet from the other compartment, a bank of fluid carrying tubes connecting said compartment having said fluid inlet with the tank spaced therefrom, a second bank of fluid carrying tubes connecting said last mentioned tank with said compartment having said fluid outlet, and spaced apart heat absorbing fins upon said banks of tubes and extending transversely thereof, of an electric motor mounted in said core between said banks of tubes and adjacent to said fins, and a fan fixed to the shaft of said motor and arranged adjacent to said core to forcibly circulate air therethrough.

7. In an automotive vehicle heating unit, the combination with a core including a fluid receiving tank, a supporting structure for said heating unit carried at the interior of said core, a support for said heating unit secured to said supporting structure, a plate member carried by said support, a box-like casing carried by said plate member, and a grill carried by said casing, of an electric motor mounted in said core, a fan driven by said motor, and means attaching said motor to said grill.

8. In an automotive vehicle heating unit, the combination with a core consisting of spaced apart fluid receiving tanks, a plurality of spaced apart fluid carrying tubes communicating with said tanks and comprising spaced apart banks of fluid carrying tubes extending from one of said fluid receiving tanks to the other, and heat absorbing fins upon said tubes and extending transversely thereof, of a supporting structure for said heating unit carried at the interior of one of said fluid receiving tanks, a support for said heating unit secured to said supporting structure, a plate member carried by said support, a casing for said core carried by said plate member, a grill carried by said casing, an electric motor mounted in said core between said banks of tubes and adjacent to said fins, a fan fixed to the shaft of said motor and arranged outside said core to forcibly circulate air past and over said tubes and between and over said fins, and means securing said motor to said grill.

9. The combination as specified in claim 1, a heating unit supporting structure carried at the interior of said core, a single pipe support for said heating unit rigidly secured to said supporting structure, and means for securing said pipe support upon a fixed part of an automotive vehicle.

10. In an automotive vehicle heating unit, the combination with a core including a fluid receiving tank, a supporting structure for said heating unit carried at the interior of said core, a single pipe support for said heating unit secured to said supporting structure, a plate mounted upon said pipe, a casing for said core carried by said plate, and a grill in said casing, of an electric motor mounted in said core, a motor fan, and means securing said motor in said core.

11. In an automotive vehicle heating unit, the combination with a core consisting of spaced apart fluid receiving tanks, a plurality of spaced apart fluid carrying tubes communicating with said tanks and comprising spaced apart banks of fluid carrying tubes extending from one of said fluid receiving tanks to the other, and heat absorbing fins upon said tubes and extending transversely thereof, said tubes and fins providing air passageways through the heating unit, of an electric motor mounted in said core between said banks of tubes and adjacent to said fins, and a fan fixed to the shaft of said motor and arranged outside said core in alinement with said air passageways to forcibly circulate air past and over said tubes and between and over said fins.

12. In an automotive vehicle heating unit, the combination with a core consisting of spaced apart fluid receiving tanks, a plurality of spaced apart fluid carrying tubes communicating with said tanks and comprising spaced apart banks of fluid carrying tubes extending from one of said fluid receiving tanks to the other, and heat absorbing fins upon said tubes and extending transversely thereof, of an electric motor mounted in said core between said banks of tubes and adjacent to said fins, and a fan fixed to the shaft of said motor and having the blades thereof arranged in alining relation with air passageways between said tubes and fins.

13. In an automotive vehicle heating unit, the combination with a core consisting of spaced apart fluid receiving tanks, a plurality of spaced apart fluid carrying tubes communicating with said tanks and comprising spaced apart banks of fluid carrying tubes extending from one of said fluid receiving tanks to the other, and heat absorbing fins upon said tubes and extending transversely thereof, of an electric motor mounted in said core between and in close proximity to said banks of tubes and in close relation to said fins, and a fan fixed to the shaft of said motor and arranged outside said core in overlying relation to a plurality of said tubes and fins.

14. In an automotive vehicle heating unit, the combination with a core consisting of spaced apart fluid receiving tanks, a plurality of spaced apart fluid carrying tubes communicating with said tanks and comprising spaced apart banks of fluid carrying tubes extending from one of said fluid receiving tanks to the other, and heat absorbing fins upon said tubes and extending transversely thereof, said banks of tubes and said fins providing a space within said core, and said tubes and said fins providing air passageways through the core, of an electric motor mounted within said space to substantially fill the same, and a fan fixed to the shaft of said motor and arranged outside said core, the blades of said fan being in alining relation to a plurality of said air passageways.

15. In an automotive vehicle heating unit, the combination with a core including a fluid receiving tank, a supporting structure for said heating unit carried at the interior of said core, a pipe support for said heating unit secured to said supporting structure, a member mounted upon said pipe, and a casing for said core supported by said member, of an electric motor mounted in said core, a motor fan, and means securing said motor in said core.

16. In an automotive vehicle heating unit, the combination with a core including a fluid receiving tank, a supporting structure for said heating unit carried at the interior of said tank, a pipe support for said heating unit secured to said supporting structure, a casing for said core, and a support for said casing mounted upon said pipe, of an electric motor mounted in said core, a motor fan arranged without the core, and supporting means for said motor.

17. An automotive vehicle heating unit comprising a fluid-heated, air-heating core, a motor mounted in said core and adapted to drive a fan situated adjacent the core, a casing for said core, motor and fan, a plate in said casing and providing a shroud for said fan, means engaging said casing and said shroud for securing the casing, the core and the shroud in fixed relation to each other, a unitary heating unit supporting structure rigidly carried by said core at the interior thereof, a single pipe support for said heating unit rigidly secured to said supporting structure and extending out of said core, said pipe support constituting a passageway for fluid traveling through said core, and means for rigidly securing said pipe support to a fixed part of an automotive vehicle.

HARRY ROSE.